(12) United States Patent
Shin

(10) Patent No.: US 7,336,237 B2
(45) Date of Patent: Feb. 26, 2008

(54) PORTABLE COMPUTER

(75) Inventor: Joeng-karb Shin, Hwasung-Kun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 510 days.

(21) Appl. No.: 10/652,515

(22) Filed: Sep. 2, 2003

(65) Prior Publication Data

US 2004/0109286 A1  Jun. 10, 2004

(30) Foreign Application Priority Data

Sep. 30, 2002 (KR) .................. 10-2002-0059538

(51) Int. Cl.
*H01Q 1/48* (2006.01)
*H01Q 1/38* (2006.01)
*H01Q 1/24* (2006.01)

(52) U.S. Cl. .............. 343/846; 343/700 MS; 343/702

(58) Field of Classification Search ........... 343/702, 343/715, 793, 879, 700 MS, 679, 683, 846
See application file for complete search history.

(56) References Cited

U.S. PATENT DOCUMENTS

| | | | | |
|---|---|---|---|---|
| 5,197,903 | A | 3/1993 | Casey et al. ............. 343/702 |
| 5,861,873 | A * | 1/1999 | Kikinis ..................... 345/157 |
| 5,913,174 | A * | 6/1999 | Casarez et al. .......... 455/557 |
| 6,388,627 | B1 * | 5/2002 | Masaki et al. ........... 343/702 |
| 6,473,296 | B2 * | 10/2002 | Amemiya et al. ........ 361/683 |
| 6,628,236 | B2 * | 9/2003 | Kim et al. ................ 343/702 |
| 6,642,892 | B2 * | 11/2003 | Masaki et al. ........... 343/702 |
| 6,786,409 | B2 * | 9/2004 | Fujii et al. ............... 235/451 |
| 6,814,593 | B2 * | 11/2004 | Wang et al. .............. 439/131 |
| 2002/0080565 | A1 * | 6/2002 | Teshima ................. 361/681 |
| 2002/0100807 | A1 * | 8/2002 | Minaguchi et al. ... 235/472.02 |
| 2002/0118136 | A1 * | 8/2002 | Gushiken ................ 343/702 |
| 2002/0142735 | A1 * | 10/2002 | Nishikawa .............. 455/90 |
| 2005/0259015 | A1 * | 11/2005 | Konishi et al. .......... 343/702 |

FOREIGN PATENT DOCUMENTS

| | | |
|---|---|---|
| EP | 0 424 029 | 4/1991 |
| JP | 3-230482 | 10/1991 |
| JP | 8-293344 | 11/1996 |
| JP | 2000-152479 | 5/2000 |
| JP | 2001-15229 | 1/2001 |
| KR | 20-212867 | 11/2000 |

\* cited by examiner

*Primary Examiner*—Shih-Chao Chen
*Assistant Examiner*—Minh Dieu A
(74) *Attorney, Agent, or Firm*—Staas & Halsey LLP

(57) ABSTRACT

A portable computer including a computer body having a main board and a display apparatus rotatably installed on the computer body. The portable computer also includes a radio communication module provided in a part of the main board formed with a through hole for radio communication and a radio antenna provided in the display apparatus that sends and receives electric waves transmitted to and from the radio communication module. A connector, coupled to the through hole, has a first connection part and a second connection part, wherein a cable member connected to the radio antenna may be detachably connected to the connector and a cable member connected to the radio communication module is also detachably connected to the connector. With this configuration, a radio antenna provided in a display apparatus and a radio communication module on the main board can be connected simply and easily.

14 Claims, 4 Drawing Sheets

140   160   110   150

PORTABLE COMPUTER

CROSS-REFERENCE TO RELATED APPLICATIONS

This application claims the benefit of Korean Application No.2002-59538, filed Sep. 30, 2002, in the Korean Intellectual Property Office, the disclosure of which is incorporated herein by reference.

BACKGROUND OF THE INVENTION

1. Field of the Invention

The present invention relates to a portable computer, more particularly to a portable computer that enables a first cable member connected to a radio antenna provided in a display apparatus and a second cable member connected to a radio communication module provided in a rear part of a main board to be connected simply and easily.

2. Description of the Related Art

Conventionally, a portable computer has a computer body including a input device, and a main board having a CPU and a graphics chip; and a display apparatus. The display apparatus is installed to be folded/unfolded relative to the computer body and has a liquid crystal display (LCD) panel to display information, that has a front and a rear cover respectively provided in the front and the rear of the LCD panel to display information to be inputted according to a user's manipulation.

The computer body generally includes an external casing forming an external appearance, that houses the main board that has the central processing unit (CPU) and a graphics chip. On the main board is mounted the CPU to process application programs and all kinds of operations, a micom to control the input device. The graphics chip generates a video signal according to the processing of the CPU. To enable a radio communication, a bluetooth module is included on the main board.

The bluetooth module is provided in a predetermined region of the main board and uses a bluetooth method, a radio communication standard known to those of ordinary skill in the art. A bluetooth antenna interposed between the front and the rear cover of the display apparatus is used to transfer data to and from the portable computer.

Referring to FIG. 4, the bluetooth module 140 provided in the rear of the main board 110 and a bluetooth antenna (not shown) provided in the display apparatus are connected by a coaxial cable 160. A through hole 150 through which the coaxial cable 160 can pass is formed in the main board 110. One end part of the coaxial cable 160 is connected to the bluetooth antenna provided in the display apparatus and the other end part passes through the through hole 150 formed in the main board 110 and is connected to the bluetooth module 140. Accordingly, the bluetooth module 140 and the bluetooth antenna are electrically connected.

But in the conventional way, the coaxial cable 160 connected to the bluetooth antenna provided in the display apparatus must pass through the through hole 150 formed in the main board 110 to be connected to the bluetooth module 140 provided in the rear of the main board 110. Thus, a portable computer having a configuration that the bluetooth module 140 is off the through hole 150 has a problem that the coaxial cable 160 passing through the through hole 150 is not connected to the bluetooth module 140.

SUMMARY OF THE INVENTION

Accordingly, it is an aspect of the present invention to provide a portable computer having a first cable member connected to a radio antenna provided in a display apparatus and a second cable member connected to a radio communication module provided in the rear of a main board to be connected simply and easily.

Additional aspects and advantages of the invention will be set forth in part in the description which follows and, in part, will be obvious from the description, or may be learned by practice of the invention.

An aspect of the present invention includes a portable computer with a computer body having a main board and a display apparatus that is rotatably installed in the computer body and has a front cover and a rear cover respectively provided in the front and the rear of an LCD panel. The portable computer also has a radio communication module provided in a rear part of the main board formed with a through hole for radio communication and at least one radio antenna provided in the display apparatus capable of transmitting and receiving electric waves to be transmitted to and received from the radio communication module. Additionally, there is a connector coupled to the through hole of the main board, having a first connection part and a second connection part, wherein a first cable member connected to the radio antenna is detachably connected to the first connection part and a second cable member connected to the radio communication module is detachably connected to the second connection part.

According to another aspect of the invention, the connector further comprises a soldering part protruded around the connector, between the first connection part and the second connection part, that is used to mount the connector onto a surrounding edge part of the through hole.

According to yet another aspect of the invention, the first connection part and the second connection part are electrically connected by a signal pin that is installed in the inside of the connector along a lengthwise direction thereof. A first connection member having a first pin insertion part into which one end part of the signal pin is inserted is provided in the first cable member, and a second connection member having a second pin insertion part into which the other end part of the signal pin is inserted is provided in the second cable member.

According to still yet another aspect of the invention, the radio antenna is interposed between the front cover and the rear cover adjacent to the computer body.

According to a further aspect of the invention, the radio communication module includes a wireless LAN module and the radio antenna includes a wireless LAN antenna.

According to a yet further aspect of the invention, the radio communication module includes a bluetooth module, and the radio antenna includes a bluetooth antenna.

BRIEF DESCRIPTION OF THE DRAWINGS

These and/or other aspects and advantages of the present invention will become apparent and more readily appreciated from the following description of preferred embodiments, taken in conjunction with the accompanying drawings of which.

DETAILED DESCRIPTION OF THE PREFERRED EMBODIMENTS

Figure 1:
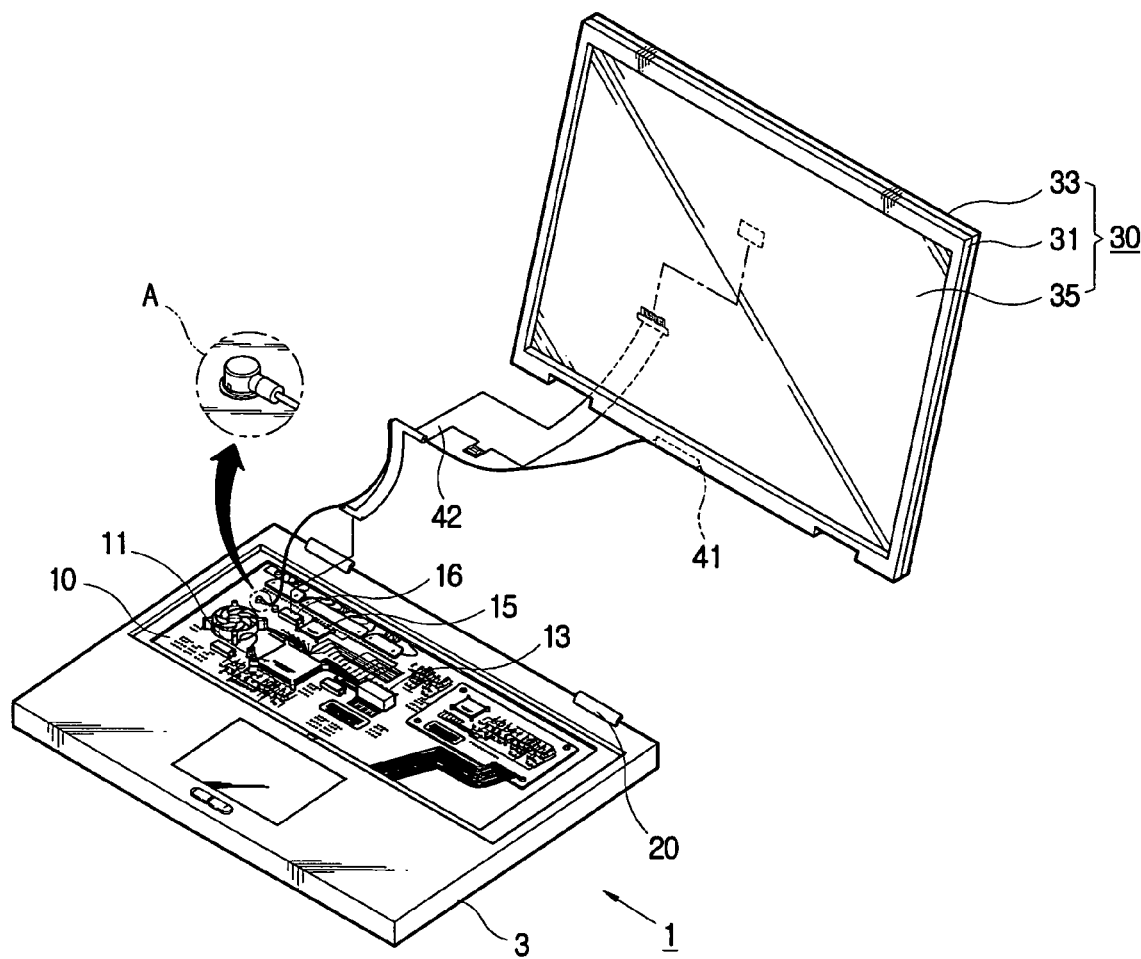
FIG. 1 is a partially exploded perspective view illustrating a portable computer according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

As shown FIG. 1, a portable computer according to an embodiment of the present invention comprises a computer body 1 and a display apparatus 30, which is installed to be rotatable relative to the computer body 1 and has a front cover 31 and a rear cover 33 respectively provided in the front and the rear of an LCD panel 35 to display a picture signal transmitted from the computer body 1.

The computer body 1 includes a casing 3 forming an external appearance, a main board 10 installed in the casing 3, on which a CPU 11 and a graphics chip 15 is mounted, and multiple hardware having an input device to output an input signal.

On the upper part of the casing 3 is mounted a keyboard (not shown), the input device to output an input signal. In an edge part of the casing 3 to be connected to the display apparatus 30 is provided a hinge 20 to allow the display apparatus 30 to rotate relative to the computer body 1.

In the main board 10 is installed the CPU 11 to process application programs and all kinds of operations, a micom 13 to control the input device, and the graphics chip 15 to generate a video signal according to the processing of the CPU 11. In the rear of the main board 10 is provided the bluetooth module 40 (shown in FIG. 3), which is a module to enable radio communication.

The graphics chip 15 is provided in the main board 10 and operates together with the CPU 11 to generate a chromaticity signal (RGB), that is, a video signal for a picture display, a clock signal (CLK) and a parallel/perpendicular synchronizing signal. Accordingly, these signals are transmitted to the display apparatus 30 via an LCD-FPC cable 42 by a video output port 16.

Figure 3:
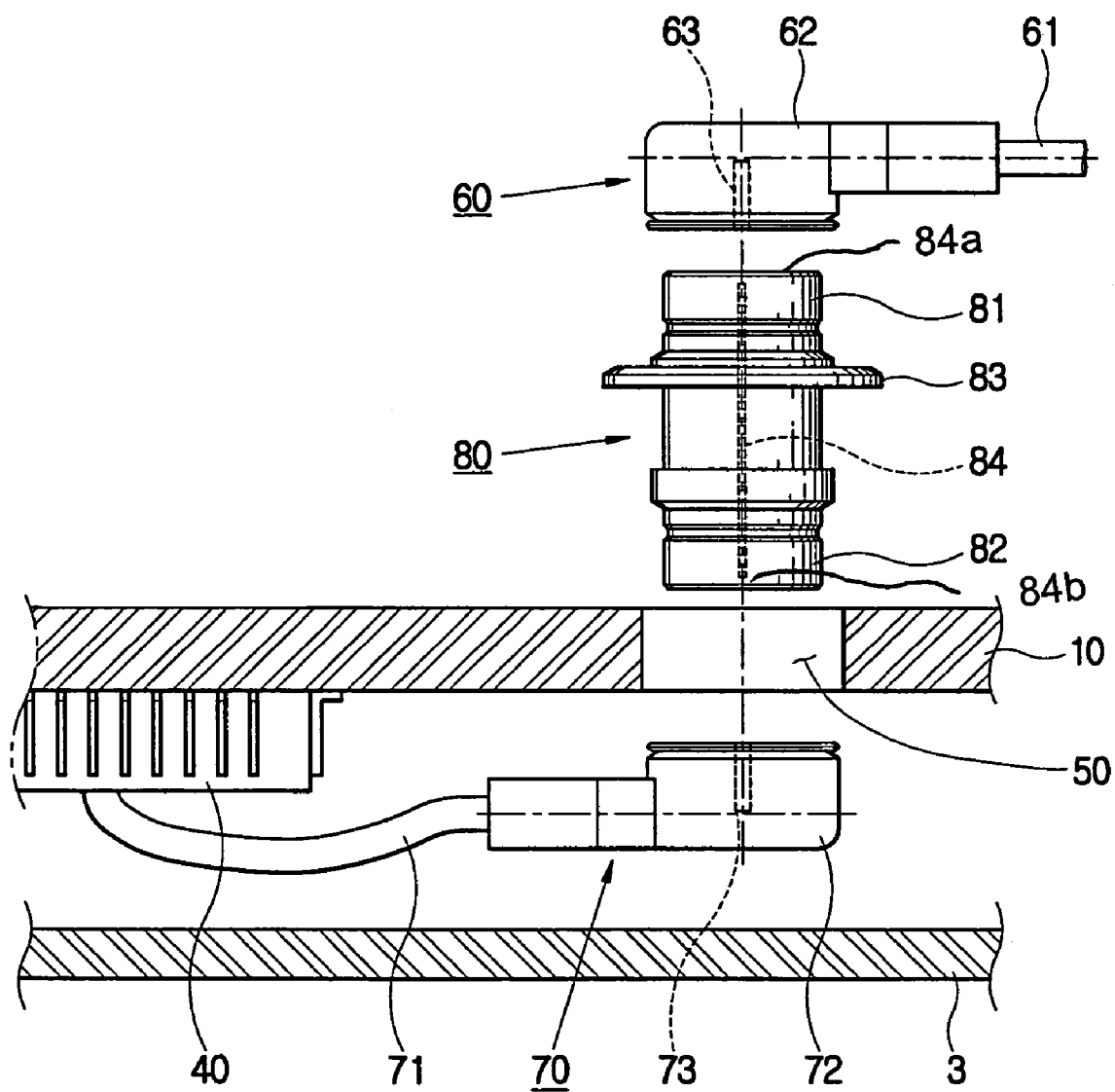
FIG. 3 is a sectional view schematically illustrating the "A" region of FIG. 1.

Referring to FIG. 1 and FIG. 3, the bluetooth module 40 is provided in a rear part of the main board 10 and uses a bluetooth method, a radio communication standard known to those of ordinary skill in the art. The bluetooth module 40 operates together with the CPU 11 on the basis of an electric wave received by a bluetooth antenna 41 (to be described later) to transfer data to a system and also transfers data in the system to the outside according to a user's manipulation.

The bluetooth antenna 41, a radio antenna, is interposed between the front cover 31 and the rear cover 33, and is formed with a PCB (Printed Circuit Board) substrate unlike a common radio antenna. The electric wave received by the bluetooth antenna 41 is transmitted to the bluetooth module 40 provided in the main board 10 through a first coaxial cable 61 and a second coaxial cable 71 connected by a connector 80 (to be described later).

Figure 2:
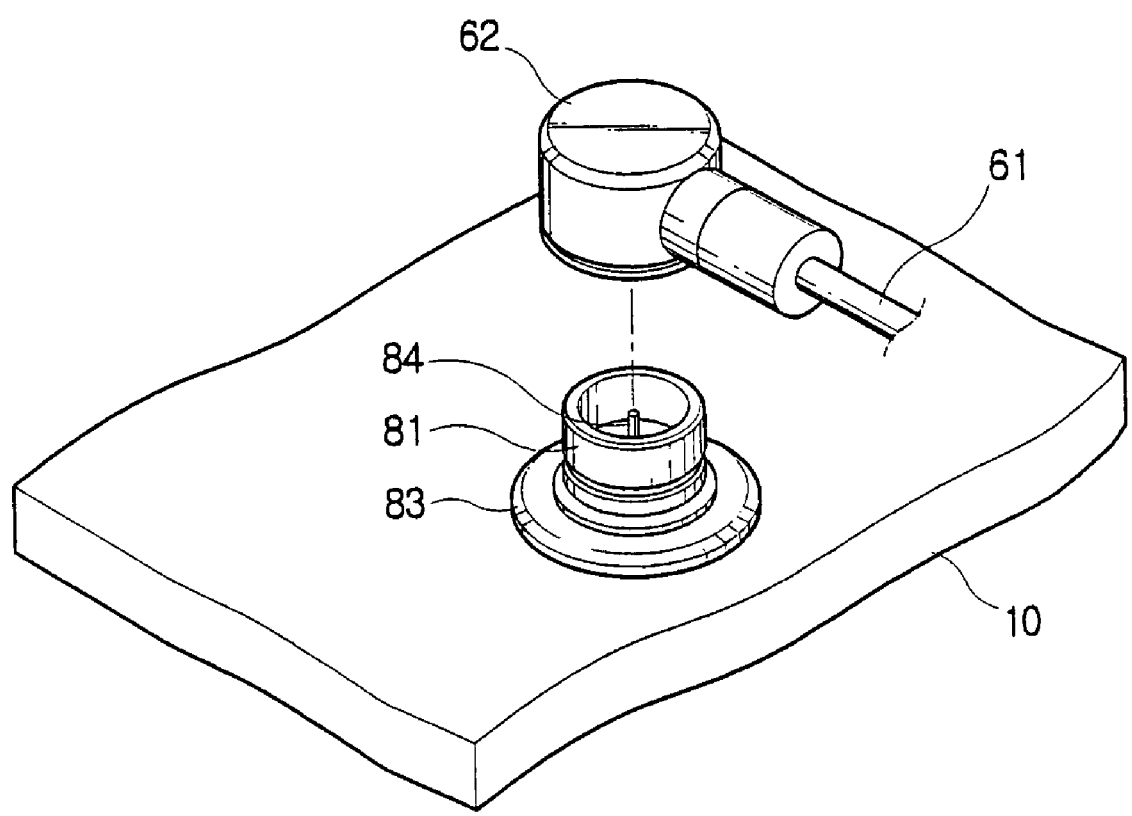
FIG. 2 is an exploded perspective view schematically illustrating the "A" region of FIG. 1.

More specifically, as shown in FIGS. 1, 2 and 3, a first cable member 60 has one end connected to the bluetooth antenna 41 and another end connected to the connector 80. A second cable member 70 has one end connected to the bluetooth module 40, and another end connected to the connector 80. Thus, the bluetooth module 40 and the bluetooth antenna 41 are electrically connected by the connector 80.

Referring to FIG. 3, first cable member 60 includes the first coaxial cable 61 having a signal line therein as a conductor to enable signals to be transmitted. The first cable member 60 also includes a first connection member 62 which is connected to a first connection part 81 of the connector 80.

The first connection member 62 has a first pin insertion part 63 therein. When the first connection member 62 and the first connection part 81 of the connector 80 are connected, a first end 84a of a signal pin 84 provided in the inside of the connector 80, is inserted into the first pin insertion part 63.

The second cable member 70 includes the second coaxial cable 71 having a signal line therein as a conductor to enable signals to be transmitted. The second cable member 70 also includes a second connection member 72 which is connected to a second connection part 82 of the connector 80.

The second connection member 72 has a second pin insertion part 73 therein. When the second connection member 72 and the second connection part 82 of the connector 80 are connected, the second end 84b of the signal pin 84 provided in the inside of the connector 80, is inserted into the second pin insertion part 73.

The connector 80 is coupled to the through hole 50 formed in a predetermined region of the main board 10, and includes the first connection part 81 to which the first connection member 62 of the first cable member 60 is detachably connected. The connector 80 also includes the second connection part 82 to which the second connection member 72 of the second cable member 70 is detachably connected.

A soldering part 83 protrudes from the connector 80 between the first connection part 81 and the second connection part 82. The soldering part 83 is fixed onto a surrounding edge part of the through hole 50 of the main board 10 by soldering, which tightly affixes the connector 80 onto the main board 10.

Signals are transmitted through the connector 80 via the signal pin 84 made of metal, that is installed inside the connector 80, along a lengthwise direction thereof. The first end 84a of the signal pin 84 is exposed through an opening of the first connection part 81 and the second end 84b of the signal pin 84 is exposed through an opening of the second connection part 82.

Therefore, when the first connection part 81 and the connection member 62 are connected, the first end 84a of the signal pin 84, exposed through the opening of the first connection part 81, is inserted into the first pin insertion part 63 of the first connection member 62. Also, when the second connection part 82 and the second connection member 72 are connected, the second end 84b of the signal pin 84, exposed through the opening of the second connection part 82, is inserted into the second pin insertion part 73 of the second connection member 72. Thus, by connecting the first coaxial cable 61 and the second coaxial cable 71 to the connector 80, the bluetooth antenna 41 provided in the display apparatus 30 and the bluetooth module 40 provided in the rear part of the main board 10 are electrically connected.

With the above configuration, a user may communicate through a radio network by using the bluetooth module 40 in the portable computer. The electric wave is received by the bluetooth antenna 41 provided in the display apparatus 30 and the received electric wave is transmitted to the bluetooth module 40 through the first and the second coaxial cables 61 and 71 connected by the connector 80. Similarly, an electric wave generated by the bluetooth module 40 is transmitted through the first and second coaxial cables 61 and 71, connected by the connector 80, to the bluetooth antenna 41, and is then transmitted to the radio network via the bluetooth antenna 41.

Figure 4:
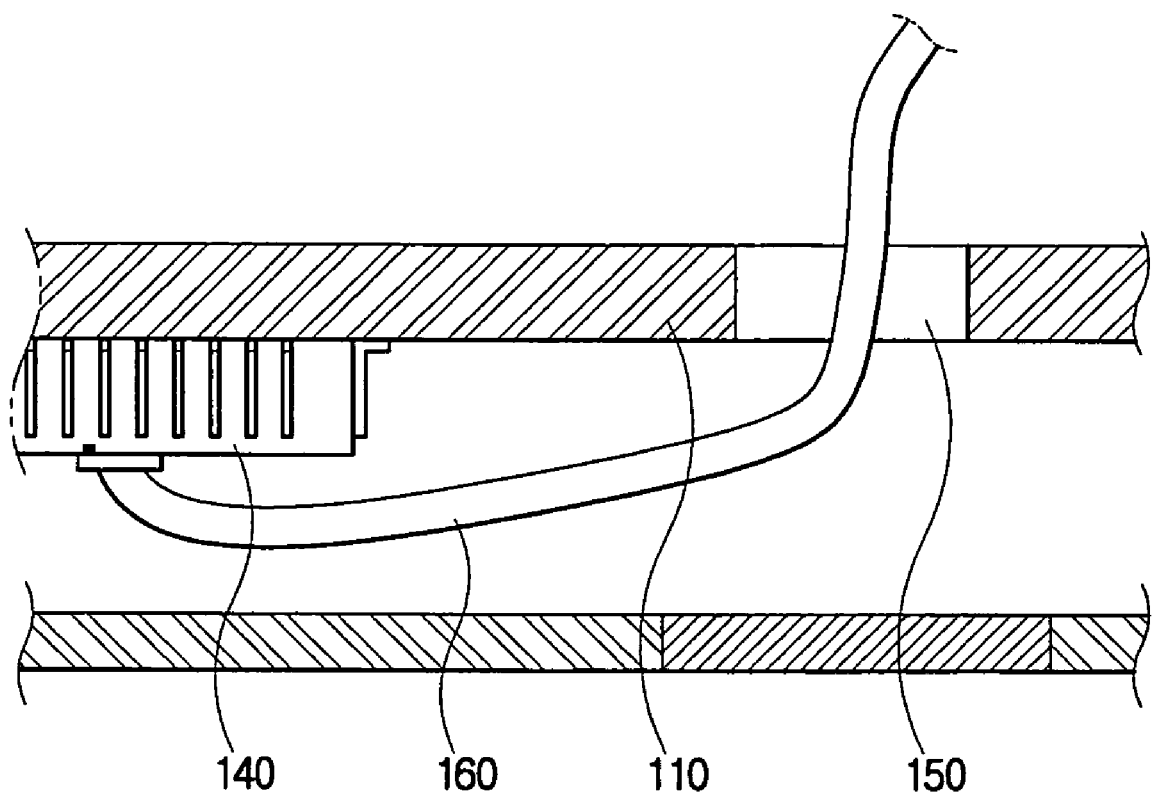
FIG. 4 is a cross-sectional view illustrating a main part of a conventional portable computer.

A conventional portable computer, as shown in FIG. 4, has a problem that an electrical connection between the bluetooth antenna and the bluetooth module 140 is limited by the distance between the through hole 150 of the main board 110 and the bluetooth module 140. To the contrary, in the portable computer according to the present invention, as shown in FIGS. 1 through 3, the connector 80, to which the first coaxial cable 61 connected to the bluetooth antenna 41 and the second coaxial cable 71 connected to the bluetooth module 40 are connected together, is fixed in the through hole 50 of the main board 10 such that independent of the distance between the through hole 50 of the main board 10 and the bluetooth module 40, the first coaxial cable 61 connected to the bluetooth antenna 41 and the second coaxial cable 71 connected to the bluetooth module 40 are connected simply, to thereby enable the bluetooth module 40 and the bluetooth antenna 41 to be electrically connected.

Similarly, a wireless LAN module can be provided instead of the bluetooth module 40. A wireless LAN (local area network) antenna may be accordingly provided in the display apparatus 30. Also, the bluetooth module 40 and the wireless LAN module can be provided in the computer body together and the bluetooth antenna 41 and the wireless LAN antenna may be provided in the display apparatus 30 together.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A portable computer including a computer body having a main board with an opening therethrough for radio communication, and a display apparatus, which has a front cover and a rear cover respectively provided in a front and a rear of an LCD panel, and the display apparatus is rotatably installed in the computer body, comprising:
   a radio communication module provided on the main board;
   at least one antenna capable of sending and receiving an electric wave and capable of communicating with the radio communication module; and
   a connector extending through the opening on the main board, having a first connection part and a second connection part, wherein a first cable member connected to the antenna is detachably connected to the first connection part, and a second cable member connected to the radio communication module is detachably connected to the second connection part.

2. The portable computer according to claim 1, wherein:
   the connector further comprises a signal pin, installed in the inside of the connector along a lengthwise direction thereof, that allows the first connection part and the second connection part to be electrically connected thereto;
   the first cable member comprises a first connection member having a first pin insertion part into which a first end of the signal pin is inserted; and
   the second cable member comprises a second connection member having a second pin insertion part into which a second end of the signal pin is inserted.

3. The portable computer according to claim 2, wherein the antenna is interposed between the front cover and the rear cover of the display apparatus.

4. The portable computer according to claim 3, wherein:
   the radio communication module includes a wireless LAN module; and
   the antenna includes a wireless LAN antenna.

5. The portable computer according to claim 3, wherein:
   the radio communication module includes a bluetooth module; and
   the antenna includes a bluetooth antenna.

6. The portable computer according to claim 1, wherein the connector further comprises a soldering part protruded from the connector, positioned between the first connection part and the second connection part, to be mounted onto a surrounding edge part of the opening in the main board.

7. The portable computer according to claim 6, wherein:
   the connector further comprises a signal pin, installed in the inside of the connector along a lengthwise direction thereof, that allows the first connection part and the second connection part to be electrically connected;
   the first cable member further comprises a first connection member having a first pin insertion part into which a first end of the signal pin is inserted; and
   the second cable member further comprises a second connection member having a second pin insertion part into which a second end of the signal pin is inserted.

8. The portable computer according to claim 7, wherein the antenna is interposed between the front cover and the rear cover of the display apparatus.

9. The portable computer according to claim 8, wherein:
   the radio communication module includes a wireless LAN module; and
   the antenna includes a wireless LAN antenna.

10. The portable computer according to claim 9, wherein:
    the radio communication module includes a bluetooth module; and
    the antenna includes a bluetooth antenna.

11. A portable computer having a main body, a display apparatus rotatably connected with the main body, a radio communication module, and an antenna disposed within the display apparatus, the portable computer comprising:
    a main board disposed within the main body and having an opening therethrough, the radio communication module being disposed on the main board;
    a connector connected to the main board at the opening;
    a first connecting member connecting the antenna and the connector; and
    a second connecting member connecting the radio communication module and the connector.

12. The portable computer of claim 11, wherein:
    the first and second connecting members are flexible.

13. The portable computer of claim 11, wherein:
    the first and second connecting members are provided at end parts of first and second cables, respectively.

14. A portable computer having a main body, and a display apparatus rotatably connected with the main body, the portable computer comprising:
    an antenna disposed within the display apparatus;
    a main board disposed within the main body and having an opening therethrough,
    a connector disposed through the opening, connected to the main board, and having a first connection part disposed on a first surface of the main board and a second connection part disposed on a second surface of the main board opposite the first surface;

a radio communication module disposed on the second surface of the main board;

a first connection member connected to the antenna and detachably connected to the first connection part; and a second connection member connected to the radio communication module and detachably connected to the second connection part.

* * * * *